United States Patent [19]

Mazzorana

[11] Patent Number: 4,564,775
[45] Date of Patent: Jan. 14, 1986

[54] DEVICE FOR ROTATABLY DRIVING A COOLING FAN OF AN ELECTRIC ROTATING MACHINE

[75] Inventor: Alfred B. Mazzorana, Venissieux, France

[73] Assignee: Societe de Paris et du Rhone, S.A., Lyons, France

[21] Appl. No.: 482,434

[22] Filed: Apr. 4, 1983

[30] Foreign Application Priority Data

Apr. 15, 1982 [FR] France .................. 82 06800

[51] Int. Cl.⁴ .............................................. H02K 9/06
[52] U.S. Cl. ........................................ 310/62; 310/63;
310/68 C; 310/68 D; 310/78; 123/41.12;
337/140; 361/25; 361/26
[58] Field of Search ................ 310/62, 90, 63, 64,
310/89, 65, 263, 159, 76, 77, 78, 92, 68 R, 68 C,
68 D; 123/41.12; 185/40 R, 40 F; 361/25, 26,
103; 74/209; 337/140

[56] References Cited

U.S. PATENT DOCUMENTS

| 1,921,042 | 8/1933 | Roos | 123/41.12 |
| 2,658,400 | 11/1953 | Dodge | 123/41.12 |
| 2,694,781 | 11/1954 | Hinz | 310/78 |
| 3,163,732 | 12/1964 | Abbott | 337/140 |
| 3,407,319 | 10/1968 | Arriaza | 310/76 |
| 3,456,141 | 7/1969 | Burgess | 310/58 |
| 3,566,168 | 2/1971 | Matsubara | 310/62 |
| 3,853,098 | 12/1974 | Ishikawa | 123/41.12 |
| 4,162,419 | 7/1979 | DeAngelis | 310/62 |
| 4,164,690 | 8/1979 | Muller | 310/63 |
| 4,200,146 | 4/1980 | Olson | 123/41.12 |
| 4,237,513 | 12/1980 | Foldes | 361/25 |
| 4,446,391 | 5/1984 | Sekine | 310/62 |

FOREIGN PATENT DOCUMENTS

| 292873 | 7/1911 | Fed. Rep. of Germany | 310/62 |
| 0671285 | 1/1939 | Fed. Rep. of Germany | 310/63 |
| 1488929 | 7/1967 | France | 310/62 |
| 2186074 | 4/1974 | France | 310/62 |
| 8120660 | 11/1981 | France | 310/62 |
| 0390375 | 8/1965 | Switzerland | 310/62 |
| 0832659 | 5/1981 | U.S.S.R. | 310/62 |

Primary Examiner—R. Skudy
Attorney, Agent, or Firm—Browdy & Neimark

[57] ABSTRACT

An arrangement for cooling an electric rotating machine such as an alternator of an automotive vehicle by means of a fan which is intermittently driven in accordance with the cooling requirements of the electric rotating machine. A heat source is associated with the electric rotating machine which is representative of the degree of heating of the rotating machine. The heat source may be the radiator of the rectifier diodes of the alternator. A heat sensitive means in the form of a spring of "memory alloy" controls the coupling/uncoupling with respect to the shaft of the rotating machine of the fan which is mounted free for rotation coaxially of the shaft of the machine. The heat sensitive means is in heat exchange relation with the heat source. The spring, for example, operates a lever which activates a control rod passing through the hollow shaft to control the coupling or clutching of the fan with respect to the rotating shaft. The "memory alloy" may be of a type which suddenly elongates in going past a certain temperature; or, alternatively, of a type which suddenly contracts in going past a certain temperature. The sudden elongation or, alternatively sudden contraction of the spring is utilized to cause a coupling of the fan with the shaft.

13 Claims, 3 Drawing Figures

DEVICE FOR ROTATABLY DRIVING A COOLING FAN OF AN ELECTRIC ROTATING MACHINE

FIELD OF THE INVENTION

This invention relates to a device for rotatably driving a cooling fan of an electric rotating machine, and more particularly a fan providing cooling of an alternator which generates the electric current used by an automotive vehicle.

DESCRIPTION OF THE PRIOR ART

The cooling fan of an alternator of an automotive vehicle is usually keyed on the rotor shaft between the front flange of the stator and the drive pulley of the alternator, unless the fan is made a single piece with the drive pulley. In any case, the fan is constantly rotatably driven by a pulley at the same time as the rotor shaft. Consequently, in particular, under certain operating conditions of the alternator for which heating is limited and does not require substantial cooling by passage of an air current, the fan rotates unnecessarily while absorbing for its drive and particularly, if the rotating speed is high, a considerable part of the mechanical power supplied to the alternator by the internal combusion engine.

Various solutions have already been proposed to avoid making the fan run unnecessarily and to try to drive it only when it is necessary to cool the alternator. None of the solutions is entirely satisfactory.

German Pat. No. 2 92873 provides for mounting the fan for free rotation around the shaft and rotatably driving the fan by magnetic coupling, provided by the leakage magnetic field of the alternator. Thus, there is obtained certain matching of the ventilation to the power demanded of the alternator and, therefore, a matching of the cooling requirements of the alternator, but the magnetic leakage field proves inadequate to cause the fan to provide sufficient cooling, when the power demanded of the alternator is high.

It has been known, as described in French Pat. No. 72 18309 published under U.S. Pat. No. 2,186,074, to make a cooling fan for an automotive vehicle alternator with fins which are able to retract more or less between disks to obtain a variation in the active surface of the fins, and therefore, a variation of the cooling action. However, the system of French Pat. No. 72 18309 is sensitive only to the rotating speed of the alternator, particularly by obtaining a retraction of the fins directly under the action of the centrifugal force, and the functioning of this system does not take into account the heating of the alternator which is not due solely to its rotating speed.

Finally, French patent application No. 81 20660 of Nov. 4, 1981, discloses an alternator whose fan can be driven at a variable rotating speed, this speed actually being able to be modulated as a function of the power of the alternator, and therefore of its cooling needs. However, the proposed solution consists in using an auxiliary electric motor to drive the fan, which in certain cases is not even mounted coaxially with the rotor shaft. A similar solution, i.e., consisting in driving the fan with an auxiliary motor was also described earlier in French Pat. No. 1,488,929 which, however, is applied to cooling three-phase electric motors and not alternators.

Moreover, no known system modulates the rotational drive of the fan from a parameter directly representing the temperature of the alternator in its usually hottest zones, whereas the cooling needs basically correspond to the need to limit the temperature of these zones to an acceptable value.

SUMMARY OF THE INVENTION

The present invention aims to remedy all of the drawbacks of the existing systems mentioned hereinbefore, by providing a drive device that, without an auxiliary motor and while retaining the standard structure and position of the fan, mades it possible to control the rotation of the fan and to cool the alternator by taking the cooling of the alternator exactly into consideration.

For this purpose, the invention essentially has as its object a drive device for a fan for cooling an electric rotating machine, providing mechanical driving of the fan from the shaft of the electric rotating machine, but intermittently, and controlled by temperature sensitive means fastened to a heat source of said electric rotating machine.

The invention provides a device that drives the fan intermittently so that the fan intervenes to cool the electric rotating machine only when the temperature detected on a part of said machine exceeds a certain value. This intermittent driving of the fan is preferably obtained by designing the device according to the invention as a coupling/uncoupling system, i.e., by mounting the fan free for rotation coaxially with the shaft of the electric rotating machine, and by providing that the temperature sensitive means cooperates with means able to control the coupling of the fan with a rotating part of the machine, under certain temperature conditions, whereby the fan is rotatably driven along with the shaft of the electric rotating machine.

In case the electric rotating machine, cooled by the fan when the latter is coupled is an alternator intended to generate rectified electric current on an automotive vehicle, it is advantageous that the heat source used to control coupling/uncoupling of the fan be the rectifier bridge of the alternator. Heating of the diodes of the rectifier bridge is actually directly representative of the current traveling through the windings of the alternator stator, and therefore of the heating of the alternator itself. The temperature sensitive means can be particularly carried by the radiator of the diodes of the rectifier bridge, and these means advantageously consist of a coil spring made of "memory alloy" such as an alloy with a base of titanium and nickel known as NITINOL, or again a "memory brass," which is suddenly deformed in the direction of a release or contraction when a certain temperature is passed.

In the case of application of the invention to an alternator, considering that the rectifier bridge is located at the alternator end opposite the fan, the spring made of "memory alloy" is preferably mounted around a guide rod between the radiator of the diodes and one end of a control lever suitable for operating a control pusher that goes through the entire length of the hollow shaft of the alternator, and which is mounted to slide in relation to the shaft, the end of said pusher opposite the control lever being connected to the mobile control part of a friction coupling by which the fan can be driven in rotation at the same time as the alternator shaft. According to a particular embodiment, the mobile control part comprises a control plate connected to the end of the pusher and fixed to guide pins that go through the alternator drive pulley and support the coupling disk which cooperates with a friction lining carried by the hub of the fan.

It is understood that in such a control mechanism that goes through the alternator shaft, the entire mobile part of the coupling rotates with the alternator shaft, while the lever operating the pusher is pivoted about a stationary axis. To provide a connection between the rotating part and the nonrotating part of the mechanism, ball contact means are placed between the control lever and one end of the control pusher which passes through the hollow shaft and/or the other end of the pusher and the friction coupling plate.

This coupling can, of course, be controlled both in the direction of coupling and uncoupling.

According to a first possibility, the spring or "memory alloy" is of the type that suddenly elongates above a certain temperature and it is associated with elastic means acting in the direction of "uncoupling" the fan, the sudden elongation of the spring under the effect of an elevation of temperature occurring against the action of said elastic means to cause coupling of the fan. In this particular case, the control pusher can be made in the form of a rod, said elastic means consisting of an uncoupling coil spring surrounding said rod and partially housed in a support cup introduced in the hollow shaft of the alternator. One or more uncoupling springs can also be placed in another position; in which case, the control rod can be replaced by a tubular pusher sliding in the hollow shaft of the alternator.

According to a second possibility, the spring or "memory alloy" is, on the contrary, of the type that suddenly shrinks above a certain temperature and it is associated with elastic means acting in the direction of coupling of the fan, the sudden elongation of the spring under the effect of a reduction of temperature occurring against the action of said elastic means to cause uncoupling of the fan. This latter embodiment, in which the elastic means can consist of a coupling spring in the shape of a washer or diaphragm placed between the drive pulley and coupling disk, is advantageous in the case where a "memory alloy" spring fails, the fan then remaining coupled by said coupling spring means and, in any case, providing cooling of the alternator, which therefore would not run the risk of being damaged by excessive heating.

To make the coaxial mounting of the fan and shaft of the electric rotating machine, such as an alternator, a simple solution consists in mounting the fan free to rotate on the machine shaft, by a bearing. This first solution has, in uncoupled position, the possible drawback of a slight rotation of the fan by the drag effect of the bearing, which can be remedied by resorting to another solution consisting in mounting the fan free to rotate on a flange of the electric rotating machine, and therefore on a nonrotating element.

In any case, the invention will be better understood from the following description, with reference to the accompanying diagrammatic drawing representing, by way of nonlimiting examples, some embodiments of this device for driving a cooling fan of an electric rotating machine:

DESCRIPTION OF THE PREFERRED EMBODIMENTS

Figure 1:
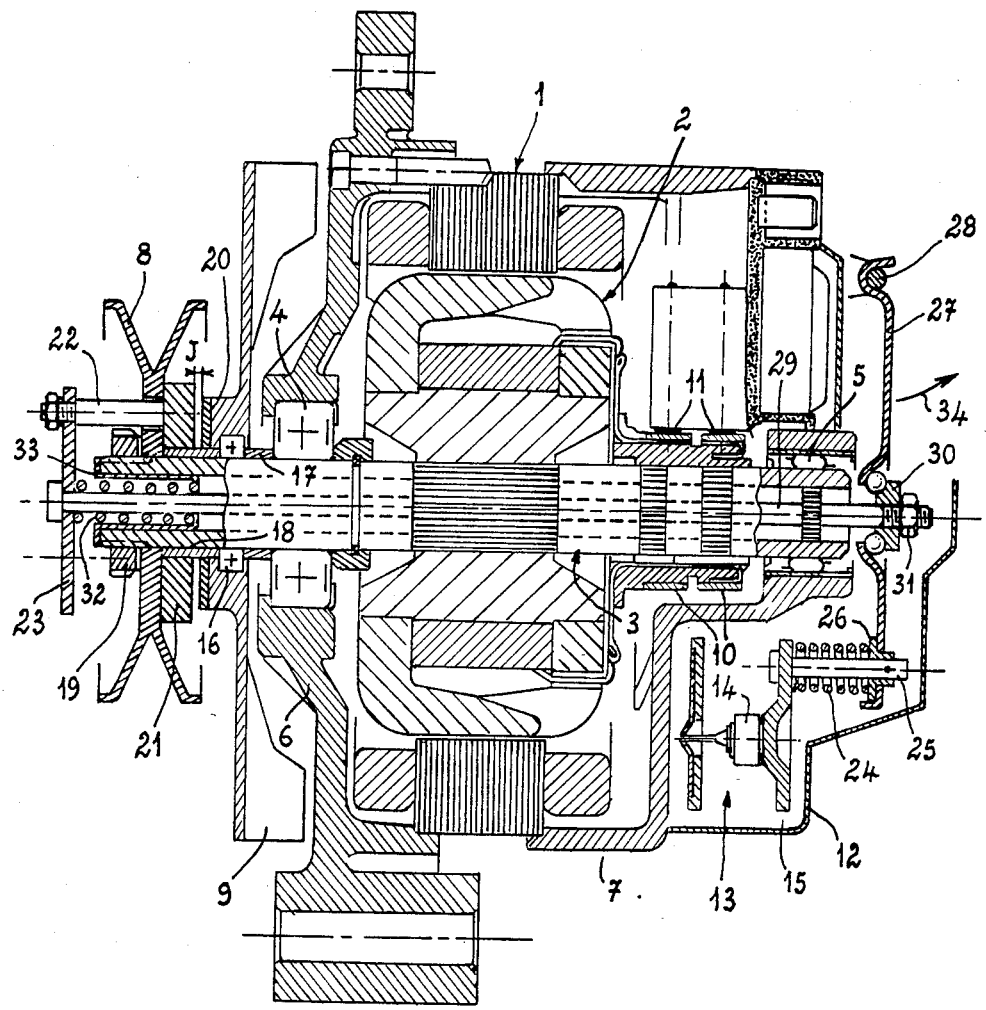
FIG. 1 is a view in section through the axis of the alternator of an automotive vehicle provided with a device for rotatably driving a fan which can be uncoupled, in accordance with this invention.
Figure 2:
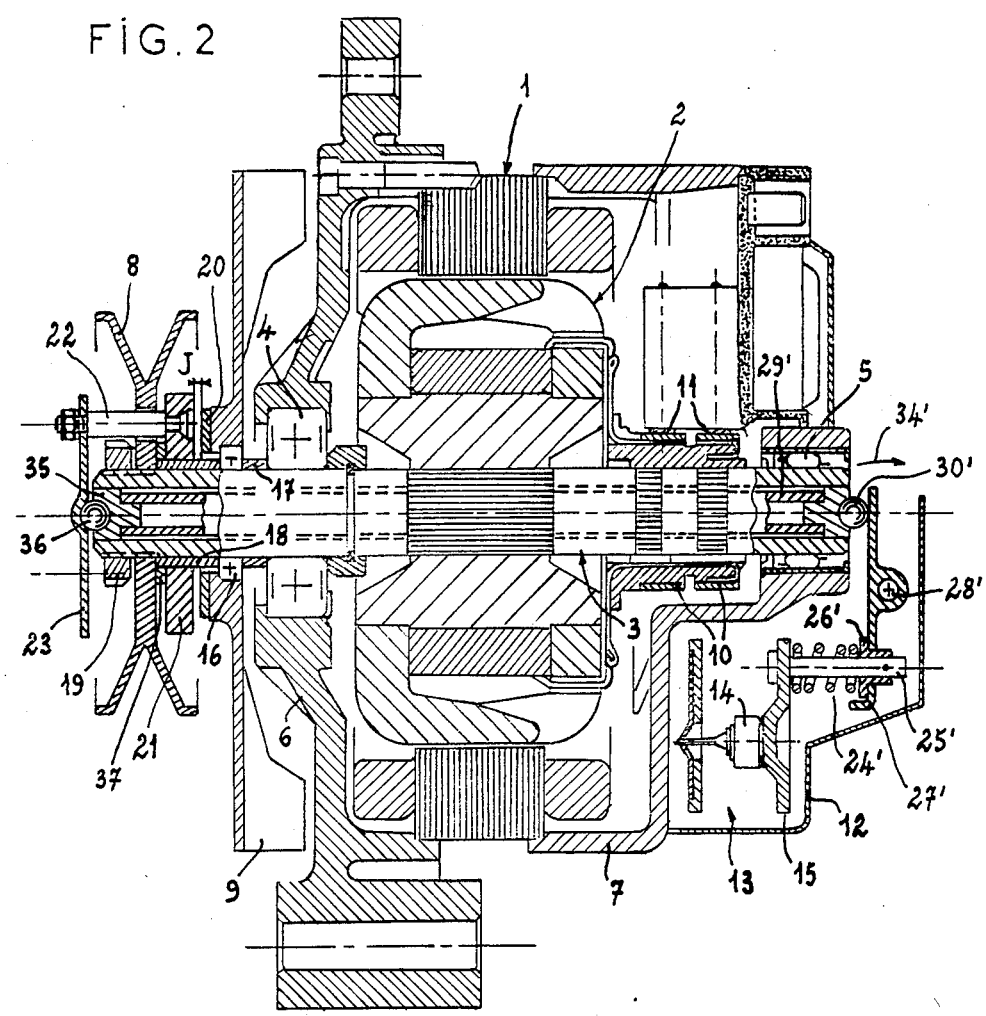
FIG. 2 is a view in section similar to FIG. 1, showing another embodiment of a device for rotatably driving a fan, which can be uncoupled.

FIGS. 1 and 2 show an alternator of an automotive vehicle with a stator 1 and a rotor 2 which is mounted on a shaft 3 which turns in bearings 4 and 5 supported by flanges 6 and 7 which hold stator 1. The end of shaft 3 located beyond flange 6 carries, on the one hand, a pully 8 for driving the alternator by a belt and, on the other hand, is surrounded by cooling fan 9. Near its other end, shaft 3 supports collector rings 10 which cooperate with brushes 11 to feed the winding of rotor 2. A cap 12, covering rear flange 7, defines, with flange 7, a housing that receives rectifier bridge 13 of the alternator, one of whose diodes can be seen at 14 while the radiator of the diodes is indicated at 15.

Still looking at FIGS. 1 and 2, fan 9 has its hub mounted around shaft 3 by a bearing 16, fan 9 thus being mounted free to rotate on shaft 3. Bearing 16 is immobilized axially on shaft 3 by a first spacer ring 17, placed between bearing 16 and bearing 4, and a second spacer ring 18, placed between bearing 16 and drive pulley 8, which is fastened on shaft 3 by tightening of a nut 19.

The hub of fan 9 carries, on the side turned toward pully 8, an annular friction lining 20, located opposite a coupling disk 21 which surrounds ring 18. Coupling disk 21 is supported by three guide pins 22, parallel to shaft 3, which pass through the flange of pulley 8 and which are fixed to control plate 23, located axially outwardly of the end of shaft 3.

In the particular embodiment of FIG. 1, a coil spring 24 of "memory alloy" is mounted around a small guide rod 25 fastened to the radiator 15 of diodes 14. Spring 24 has the property of suddenly elongating above a certain temperature threshold and, on the other hand, of suddenly contracting when the temperature comes back under this threshold. The end of spring 24 that is away from radiator 15 bears against a grommet 26, constituting an electrical and thermal insulator, which is guided along the rod 25, and rests on one end of a control lever 27, whose other end pivots about a stationary pivot 28. As viewed in FIG. 1, lever 27 is approximately perpendicular to shaft 3, which is hollow and is passed through over its entire length by a sliding control rod 29, a ball stop 30 held by adjusting nut 31 assuring the connection between the intermediate part of control lever 27 and the back end of control rod 29. The front end of control rod 29 is connected to control plate 23 and surrounded by an uncoupling coil spring 32 compressed between plate 23, on the one hand, and a support cup 33 introduced in hollow shaft 3, on the other hand.

Below the temperature threshold already mentioned, spring 24 of "memory alloy" remains compressed, and uncoupling spring 32 thrusts control plate 23 toward the left in FIG. 1. By means of guide pins 22, plate 23 holds coupling disk 21 away from friction lining 20, a certain axial clearance J then existing between lining 20 and disk 21. Thus disk 21 turns at the same time as shaft 3, considering its link in rotation with drive pulley 8, but fan 9 remains uncoupled and therefore is not driven in rotation with shaft 3.

When the temperature threshold is exceeded, spring 24, suddenly expanding, causes control lever 27 to pivot in the direction indicated by arrow 34. Control rod 29, control plate 23 and coupling disk 21 are then moved toward the right in FIG. 1, and uncoupling spring 32 is further compressed. Coupling disk 21 comes into contact with friction lining 20, and fan 9 is then rotatably driven along with shaft 3.

In the particular embodiment of FIG. 2, coil spring 24' of "memory alloy," still mounted around a small guide rod 25' fastened to the radiator of diodes 15, is of a different type, retracting above a certain temperature threshold and elongating when the temperature comes back below this threshold. The end of spring 24' which is spaced from radiator 15 rests against a grommet 26', constituting an electrical and thermal insulator, which is guided along rod 25' and bears against one end of a control lever 27' which is pivoted at an intermediate point 28'. The other end of lever 27' acts, by a ball 30' on the back end of a tubular control pusher 29' which extends through hollow shaft 3 over its entire length. At its front end, pusher 29' comprises a tip 35 which acts on control plate 23 by a contact ball 36. A coupling spring 37, in the shape of a washer or diaphragm, is placed here between the flange of drive pulley 8 and coupling disk 21 around spacer ring 18.

Below the temperature threshold already mentioned, spring 24' of "memory alloy" remains expanded as seen in FIG. 2, and control lever 27'∝ holds tubular pusher 29', control plate 23 and coupling disk 21 thrust toward the left in FIG. 2, by compressing coupling spring 37. A certain axial clearance J then separates coupling disk 21 from friction lining 20 so that fan 9 remains uncoupled and therefore is not driven in rotation with shaft 3.

When the temperature threshold is exceeded, the sudden contraction of spring 24' makes possible the pivoting of lever 27' around its pivot point 28' in the direction indicated by arrow 34' while tubular pusher 29', control plate 23 and couplingg disk 21 are moved toward the right in FIG. 2, under the effect of coupling spring 37. Coupling disk 21 comes in contact with friction lining 20, and fan 9 is then driven in rotation along with shaft 3.

If spring 24' of "memory alloy" fails, the other spring 37 still intervenes so that cooling fan 9 remains coupled, which constitutes a safety feature for the alternator.

Figure 3:
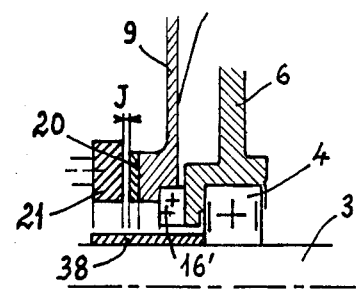
FIG. 3 is a partial view in section of an alternator similar to those in FIGS. 1 and 2, illustrating a variant to the rotatable mounting of the fan which can be uncoupled.

FIG. 3 shows a varient, in which fan 9 is not mounted free to rotate on shaft 3 of the alternator but is mounted to turn on a collar of flange 6 of the alternator by a bearing 16'. Thus, in uncoupled position, fan 9 is not subjected to any driving effect by shaft 3. The mechanism controlling coupling and uncoupling, which is not shown, can be made eiher according to the principle of FIG. 1 or FIG. 2. The two spacer rings 17 and 18 are replaced here by a single ring 38.

It goes without saying that the invention is not limited to the embodiments of this drive device that can be uncoupled for a cooling fan of an electric rotating machine which have been described hereinbefore, by way of example, incorporated in an alternator of an automotive vehicle, but on the contrary, it takes in all the variant embodiments and application based on the same principles.

I claim:

1. In combination with an alternator intended for generation of electric current in a motor vehicle, said alternator normally operating at or below a characteristic operating temperature, and including a stator, a rotating shaft, a rotor mounted on the shaft, and fan means carried coaxially by the shaft for temporary cooling of the alternator, the combination comprising:

a bridge diode rectifier connected to said alternator;
means for mounting said fan means for free rotation on said shaft;
friction clutch means including means for selectively controlling the mechanical connection of said fan means with said shaft to drive said fan means in rotation with said shaft; and
temperature sensitive means including spring means, made of a "memory alloy", for effecting the connection of the fan means with said shaft, said temperature sensitive means being sensitive to a rise in temperature associated with said bridge diode rectifier for actuating said controlling means, and controlling the engagement of said friction clutch means to drive the fan means in rotation with said shaft when the temperature detected on the bridge diode rectifier corresponds to a temperature in excess of said characteristic normal operating temperature of the alternator.

2. The combination defined in claim 1 further comprising elastic means for uncoupling of the fan means, and wherein said spring means comprises a coil spring, and said "memory alloy" is capable of a sudden elongation above a certain temperature, a sudden elongation of said spring means under the effect of a rise in temperature occurring against the action of said elastic means to cause coupling of said fan means with said shaft.

3. The combination defined in claim 2 further comprising a rod-like control pusher, said shaft being hollow and said control pusher being carried within said shaft and wherein said elastic means consists of an uncoupling coil spring surrounding said control pusher and partially housed in a support cup located in the hollow shaft of the alternator.

4. The combination defined in claim 1 further comprising elastic means for coupling of said fan means, and in which said spring means comprises a coil spring, and said "memory alloy" is capable of sudden contracting above a certain temperature, a sudden elongation of the spring means under the effect of a reduction in temperature occurring against the action of said elastic means to causer uncoupling of said fan means from said shaft.

5. In combination, an electric rotating machine, capable of operating at or below a normal characteristic operating temperature, including a rotatable shaft, a fan carried by said shaft for selectively cooling said machine, means mounting said fan for intermittent driven connection relative to said shaft in dependence on the cooling requirements of said rotating machine, temperature sensitive means for detecting temperature in excess of said characteristic operating temperature, and means coupling said temperature sensitive means with said fan whereby the intermittent driven connection of said fan with said shaft is controlled when said detecting means detects said excess temperature, said electric rotating machine comprising an alternator for an automotive vehicle and further comprising rectifier means connected to said alternator for providing a rectified electric current for said vehicle, said rectifier means controlling the intermittent connection of said fan with said shaft, said temperature sensitive means being in heat exchange relation with said rectifier means,
said shaft being hollow, and further comprising a control pusher member which extends through the entire length of said hollow shaft, said control pusher member being mounted to slide relative to said shaft, a control lever operatively coupled to said pusher member, said control lever being adapted to actuate said control pusher member, a friction coupling means including a first coupling element carried by said fan and a second coupling element rotatable with said shaft, a spring of heat sensitive "memory alloy" in heat exchange relation with said rectifier means, said spring of "memory alloy" being engageable with said control lever to cause said control lever to actuate said control pusher member, the end of said control pusher member opposite said control lever being connected to said second coupling element, whereby movement of said pusher member by said control lever is effective to engage said second coupling element with said first coupling element and thereby to cause said fan to be rotatably driven with said shaft.

6. The combination defined in claim 5 comprising a control plate connected to the end of said pusher member which is remote from said control lever, said control plate having at least one guide pin affixed thereto which extends through the drive pulley of the alternator, said drive pulley being fixed to said shaft, the end of said guide pin on the opposite side of said pulley being connected to said second coupling element, whereby said second coupling element rotates with said shaft, said second coupling element being movable with said pusher member into engagement with said first coupling element whereby to rotatably drive said fan.

7. The combination defined in claim 6 comprising ball contact means between said control lever and one end of said control pusher member.

8. The combination defined in claim 7 additionally comprising ball contact means between the opposite end of said control pusher member and said control plate.

9. The combination defined in claim 6 and further comprising elastic means consisting of a washer-like coupling spring placed between said drive pulley and said second coupling element.

10. In combination with an alternator intended for generation of electric current in a motor vehicle, said alternator normally operating at or below a characteristic operating temperature, and including a stator, a rotating shaft, a rotor mounted on the shaft, and fan means carried coaxially by the shaft for temporary cooling of the alternator, the combination comprising:
a bridge diode rectifier connected to said alternator;
means for mounting said fan means for free rotation on said shaft;
friction clutch means including means for selectively controlling mechanical connection of said fan means with said shaft to drive said fan means in rotation with said shaft; and
temperature sensitive means sensitive to a rise in temperature associated with said bridge diode rectifier for actuating said controlling means, said temperature sensitive means comprising deformable means, made of "memory alloy", for effecting the connection of the fan means with said shaft, and controlling engagement of said friction clutch means to drive the fan means in rotation with said shaft when the temperature detected on said bridge diode rectifier corresponds to a temperature in excess of said characteristic normal operating temperature of the alternator.

11. The combination defined in claim 10 wherein said fan means, mounted for free rotation on said shaft, includes bearing means supporting said fan means for rotation on said shaft.

12. The combination defined in claim 10 in which said alternator comprises a flange, and said fan means is mounted for free rotation on said flange.

13. In combination with an alternator intended for generation of electric current in a motor vehicle, said alternator normally operating at or below a characteristic operating temperature, and including a stator, a rotating shaft, a rotor mounted on the shaft, and fan means carried coaxially by the shaft for temporary cooling of the alternator, the combination comprising:
bridge diode rectifier means mounted adjacent to said alternator and including a radiator;
means for mounting said fan means for free rotation on said shaft;
friction clutch means including means for selectively controlling mechanical connection of said fan means with said shaft to drive said fan means in rotation with said shaft; and
temperature sensitive means sensitive to a rise in temperature associated with said bridgd diode rectifier means for actuating said controlling means, said temperature sensitive means being located on said radiator and controlling engagement of said friction clutch means to drive the fan means in rotation with said bridge diode rectifier means corresponds to a temperature in excess of said characteristic normal operating temperature of the alternator.

* * * * *